United States Patent Office 3,647,868
Patented Mar. 7, 1972

3,647,868
N-(2-HYDROXYALKYL) SARCOSINE-N-OXIDES
Robert Ernst, Los Angeles, Calif., assignor to
Textilana Corporation, Hawthorne, Calif.
No Drawing. Filed Oct. 18, 1967, Ser. No. 676,035
Int. Cl. C07c *101/12, 101/30*
U.S. Cl. 260—534 M          18 Claims

ABSTRACT OF THE DISCLOSURE

Amine oxide compounds having the formula:

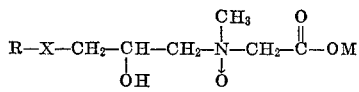

in which X is either oxygen or a methylene radical and R is a higher alkyl group, preferably unsubstituted, having 8–18 carbon atoms when X is oxygen and 6–16 carbon atoms when X is a methylene radical, and M is an alkali metal, hydrogen, ammonia or a water soluble amine group, the compounds being prepared by reacting an alkali metal salt of sarcosine with an epoxy compound having the formula:

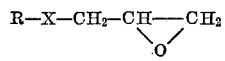

where R and X have the meaning set forth above to yield N-(2-hydroxyalkyl) sarcosine compounds having the formula:

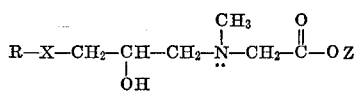

where R and X have the above meaning; and Z is an alkali metal preferably sodium or potassium; thereafter oxidizing these compounds with hydrogen peroxide and, if desired, replacing the alkali metal Z with hydrogen, ammonia, or a water soluble amine.

---

This invention relates to novel surface active compounds having outstanding properties as wetting agents, foam formers, and detergents and to a method for their preparation. These compounds are characterized by bland taste and mildness in contact with the skin, and are, therefore, particularly useful surface active agents in the preparation of shampoo formulations, non-soap bars or modified soap bars, dentifrice compositions, mouth wash, and other personal use compounds. A particular advantage of my compound is the fact that they are good froth formers and are not deactivated by polyvalent metal ions as, for example, found in stannous fluoride which is a common ingredient in present day dentifrice compositions.

The N-2-hydroxyalkyl sarcosine-N-oxides, as described below, are essentially non-corrosive, even in dilute aqueous solutions, and may be employed as corrosion inhibitors or as additives to other surface active agents to reduce or eliminate their corrosive action. This property is of particular advantage where the finished product is packaged in aerosol or other metal containers or is applied to metal surfaces, as for instance in steel cleaners or plating solutions.

The novel surface active agents of my invention are derivatives of N-(2-hydroxyalkyl) sarcosines and salts thereof as shown in the formula:

(I) 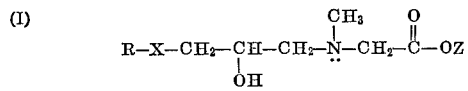

where R is an alkyl group, preferably unsubstituted, having 8–18 carbon atoms when X is oxygen and 6–16 carbon atoms when X is a methylene radical, and Z is an alkali metal, preferably sodium or potassium. The above compounds, where Z is hydrogen, can also be used in forming my N-(2-hydroxyalkyl) sarcosine amine oxides.

The precursor compounds falling within the above generic Formula I show useful properties in soft and hard water over the entire pH range but solubility and foam forming ability are markedly reduced in hard water. Also, these compounds show some activity as primary skin irritants.

It is a surprising discovery that the sensitivity of the precursor compounds (I) to hard water can be circumvented by conversion of the compounds into their corresponding oxides, without the loss of their highly desirable properties. Also, the mild skin irritant properties of the N-(2-hydroxyalkyl) sarcosine precursor compounds (I) is improved by their conversion to the corresponding amine oxides. The amine oxides which constitute the compounds of my invention have the generic formula:

(II) 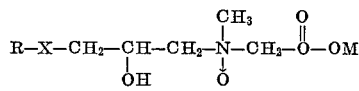

in which R and X have the same meaning as set forth above, and M is an alkali metal, hydrogen, ammonia or a water soluble amine group.

Among the various water soluble amines are mono-, di-, and triethanol amine; mono-, di-, and triisopropanol amines; mono-, di-, and trimethyl amines; mono-, di-, and triethyl amine; mixed amines such as methyl diethylamine, 2-amino-2-methyl 1-propanol; and morpholine, which may be generally categorized as water soluble alkyl, hydroxyalkyl, or alkyl ether amines.

The precursor compounds (I) are prepared by reaction of an alkali metal salt of sarcosine, such as for instance sodium sarcosinate, with an epoxy compound conforming to the following structure:

(III) 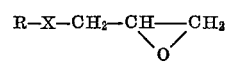

where R and X have the meaning set forth above. Glycidyl ethers (III) where X is oxygen may be, for instance, prepared by the process given in U.S. Pat. 2,989,547 and may contain minor amounts of higher ethers as shown in the patent. Where X is a methylene radical in Formula III, such compounds are derived by epoxidation of alpha olefins having suitable molecular weight. The alpha olefins may be those produced by thermal cracking of petroleum waxes (See Justice, D. and V. Lamberti, Chem. Eng. Progr. 60, 12:35 1964) or the process of K. Ziegler (German Pat. 878,560; U.S. Pat. 2,781,410). Epoxidation may be accomplished by reaction of the alpha olefin with organic peracids, such as peracetic acid. Epoxides produced by any other suitable process may also be employed.

The reaction of sodium sarcosinate with N-octylene (1–2) epoxide and with long chain glycidyl ethers is disclosed in Fette Seifen Anstrichmittel, 11:964–967 (1966).

In forming my novel products, an alkali metal salt of sarcosine, e.g., sodium or potassium, is heated with an epoxide as shown in Formula III in a reaction medium of water or aqueous alcohol. In place of alcohol other suitable water miscible polar solvents may be used. However, the use of water and/or water soluble alcohols is preferred. The reaction may be carried out atmospherically or under pressure and preferably under an inert atmosphere. Reaction under pressure is particularly indicated where volatile organic solvents such as methanol, ethanol, isopropanol, and other solvents having high vapor pressures are employed. Agitation of the reaction mixture at temperatures of 90° C.–120° C. for 2–6 hours is generally sufficient for practical completion of the reaction. The reactants may be employed in about equimolar quantities although a slight excess of the sarcosinate reactant is preferred. The course of the reaction can be followed by analysis of the reaction mixture to determine the quantity of the unreacted sarcosine salt.

The N-(2-hydroxyalkyl) sarcosine precursor compounds will be in the form shown in Formula I in which Z is an alkali metal. The alkali metal can be readily replaced by hydrogen by placing the alkali metal salt in an acid medium. The hydrogen can, in turn, be replaced by ammonia or an amine by reaction of the sarcosine acid with ammonia or an amine.

The oxidation of the alkali metal N-(2-hydroxyalkyl) sarcosinates (Formula I) to form my amine oxides (Forfula II) is carried out in water or an aqueous alcohol medium using hydrogen peroxide as the oxidant. Due to the high purity of the N-(2-hydroxyalkyl) sarcosinates obtained according to the above procedure, the sarcosines do not have to be purified prior to their oxidation to form my amine oxides of Formula II. The hydrogen peroxide may, therefore, be added directly to the reaction mixture containing the alkali metal N-(2-hydroxyalkyl) sarcosinates which affords a convenient 2-step process to form my amine oxides of Formula II.

The alkali metal in my amine oxides of Formula II can be replaced by hydrogen, ammonia or an amine in the manner outlined above in my discussion of the alkali metal sarcosinate precursor compounds of Formula I.

To further illustrate my invention, there are presented the following examples in which all parts and percentages are by weight unless otherwise indicated.

EXAMPLE I

N-(2-hydroxydodecyl) sodium sarcosinate

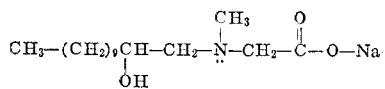

A 2000 ml., type 316 stainless steel pressure reaction apparatus (Parr Instrument Company, Series 4500) equipped with stirring assembly and cooling coils was charged with the following reagents:

|  | G. |
| --- | --- |
| 1,2-epoxy dodecene (prepared from Ziegler alpha olefin), oxiran oxygen 8.7% $I_2$ number 0.4, M.W. 183.9 (based on oxiran oxygen value), 0.9 mole | 165.50 |
| Sodium sarcosinate, assay 32.0% in water, salt content 2.7%, pH as is 12.0, 1.0 mole | 346.90 |
| Ethanol, formula SDA 3A, 190 proof | 104.40 |

The reactor was flushed out with nitrogen gas, and the reagents were heated under a nitrogen pressure of about 10 p.s.i.g. to protect against color degradation. The temperature was brought to 117° C. in 30 minutes by means of an electrically heated mantle and held at this temperature ±7° C. for six hours using a temperature recording controller. The maximum pressure noted was 92 p.s.i.g. Samples were taken after two, four, and six hours, at the set temperature, and were analyzed to determine the degree of completion of the reaction. The values (as is basis) which were found are as follows:

|  | After— | | |
| --- | --- | --- | --- |
|  | 2 hours | 4 hours | 6 hours |
| Percent total nonionics [1] | 1.6 | 1.0 | 0.79 |
| Percent sodium sarcosinate | | | [2] 2.72 |
| Percent total solids (oven dried, 105° C.) | | | 50.24 |
| Color, Hellige, VCS | | | 4 |
| Physical form | | | [3] |

[1] Epoxide plus nonionic impurities, largely alcohol and hydrocarbons.
[2] Theoretical excess=1.8%.
[3] Pale amber liquid.

Infrared spectrophotometric scans showed that the typical absorption bands arising from the oxiran radical were absent after the four-hour reaction period. A portion of the product of reaction of Example I (obtained following the six-hour reaction period) was converted to the corresponding oxide by reaction with hydrogen peroxide, as in the following example.

EXAMPLE II

N-(2-hydroxydodecyl) sodium sarcosinate-N-oxide

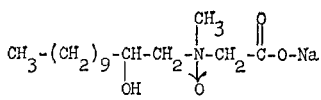

The reaction apparatus consisted of a 4-necked, 1000 ml. distilling flask, equipped with a stainless steel stirring assembly, a thermometer, a Friedrichs condenser, and a graduated funnel. The flask was charged with:

|  | G. |
| --- | --- |
| N-(2-hydroxydodecyl) sodium sarcosinate, 0.5 mol equivalent | 342.66 |
| (Containing approx. 0.55 mol equivalent expressed as amine) | |
| The funnel was charged with: hydrogen peroxide, 35% solution, 0.605 mol | 58.77 |

The hydrogen peroxide was added dropwise to the agitated solution of N-(2-hydroxydodecyl) sodium sarcosinate at such a rate as to keep the highly exothermic reaction under control and to prevent the temperature from exceeding about 60° C. The addition of the hydrogen peroxide required two hours and the temperature rose from 28° C. to 58° C. The agitated solution was then heated for an additional period of five hours at about 60° C. and was then cooled and analyzed. The following values (as is basis) were found:

| Percent free hydrogen peroxide | p.p.m. | 65 |
| --- | --- | --- |
| Percent total nonionics | | 0.78 |
| Percent total solids (vacuum oven, 60° C.) | | 41.2 |
| Color, Hellige VCS | | 6 |
| Physical form: Pale amber liquid. | | |

EXAMPLE III

N-(2-hydroxytetradecyl) sodium sarcosinate

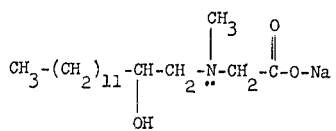

The reaction apparatus described in Example I was charged with the following reagents:

|  | G. |
| --- | --- |
| 1,2-epoxy tetradecene (prepared from Ziegler alpha olefin), oxiran oxygen 7.2%, $I_2$ number 2.3, M.W. 222.2 (based on oxiran oxygen value), 0.8 mole | 177.77 |
| Sodium sarcosinate, 32.0% solution, 0.88 mole | 305.25 |
| Ethanol, formula SDA 3A, 190 proof | 94.12 |

The reaction mass was purged with nitrogen and heated under a nitrogen pressure of about 5 p.s.i.g. with agitation for six hours at a temperature of 99° C.±3° C. A maximum pressure of 48 p.s.i.g. was recorded. The analytical values (as is basis) found for the product of this example are as follows:

| Percent total nonionics | 1.2 |
| --- | --- |
| Percent sodium sarcosinate | 3.17 |
| Percent total solids (oven dried, 105° C.) | 50.8 |
| pH (as is basis) | 11.6 |
| Color, Hellige VCS | 5 |
| Physical form: Pale amber liquid. | |

A portion of the reaction product of Example III was converted to the corresponding oxide, as shown in the following example. When Example III is repeated using potassium sarcosinate in lieu of sodium sarcosinate, the corresponding N-(2-hydroxytetradecyl) potassium sarcosinate is obtained.

EXAMPLE IV

N-(2-hydroxytetradecyl) sodium sarcosinate-N-oxide

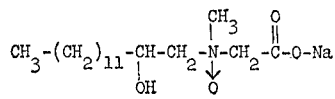

The apparatus described in Example II was charged with:

| | G. |
|---|---|
| N-(2-hydroxytetradecyl) sodium sarcosinate, 0.4 mol equivalent | 288.57 |
| Hydrogen peroxide, 35% solution, 0.484 mol | 47.0 |

The hydrogen peroxide was added dropwise over a period of 1½ hours. The exothermic reaction raised the temperature from 25° C. to 54° C. The reaction mass was stirred for four additional hours without further heating, and the temperature fell to 29° C. The following analytical values (as is basis) were found:

| | |
|---|---|
| Percent free hydrogen peroxide | p.pm 50 |
| Percent total nonionics | 0.94 |
| Percent total solids (vacuum oven, 60° C.) | 49.8 |
| Color, Hellige VCS | 7 |
| pH | 9.7 |

Physical form: Light amber colored solution.

As shown in Example IV, oxidation of the N-(2-hydroxytetradecyl) sodium sarcosinate of Example III produced the corresponding N-(2-hydroxytetradecyl) sodium sarcosinate-N-oxide. Similarly, oxidation of N-(2 - hydroxytetradecyl) potassium sarcosinate will produce the N-(2-hydroxytetradecyl) potassium sarcosinate-N-oxide.

EXAMPLE V

N-(2-hydroxypentadecyl/hexadecyl) sodium sarcosinate

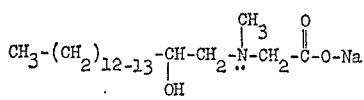

Proceeding as with Example III, the following charge was reacted: a 1,2-epoxy pentadecane, 1,2-epoxy hexadecane mixture (prepared from cracked petroleum wax based alpha olefin), oxiran oxygen 6.8%, $I_2$ number 2.6, M.W. 235.3 (equivalent

| | G. |
|---|---|
| Weight based upon oxiran oxygen value), 0.7 mole | 164.7 |
| Sodium sarcosinate, assay 32.2% in water, salt content 0.3% pH as is 12.3, 0.77 mole | 265.43 |
| Ethanol, SDA 3A, 190 proof | 54.7 |

After a six-hour reaction at 93° C.±3° C. there resulted upon cooling a pasty liquid having the following analytical values (as is basis):

| | |
|---|---|
| Percent total nonionics | 2.11 |
| Percent total solids (oven, 105° C.) | 53.4 |
| pH | 11.6 |
| Color, Hellige VCS | 7 |

The mixed N-(2-hydroxypentadecyl) sodium sarcosinate-N-(2-hydroxyhexadecyl) sodium sarcosinate product produced according to this example was oxidized, as set forth in the following example to form the corresponding mixed amine oxide.

EXAMPLE VI

N-(2-hydroxypentadecyl/hexadecyl) sodium sarcosinate -N-oxide

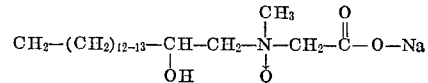

Following the procedure of Example IV, the following charge was reacted:

| | G. |
|---|---|
| N-(2 - hydroxypentadecyl/hexadecyl) sodium sarcosinate, 0.5 mol equivalent (containing approx. 0.55 mole equivalent expressed as amine, from Example V) | 346.3 |
| Hydrogen peroxide, 35% solution, 0.605 mole | 58.77 |

The hydrogen peroxide was added over a period of one hour and forty minutes, during which time the temperature rose from 26° C. to 59° C. The reaction mass was stirred for an additional four hours, with the temperature dropping to 30° C. The analytical values (as is basis) for the product of this example were as follows:

| | |
|---|---|
| Percent free hydrogen peroxide | Nil |
| Percent total nonionics | 3.5 |
| Percent total solids | 50.4 |
| Color, Hellige VCS | 12 |
| pH | 9.8 |

Physical form: Amber colored liquid.

EXAMPLE VII

N(3-fatty alkoxy-2-hydroxypropyl) sodium sarcosinate

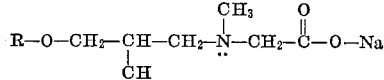

A 1000 ml. distilling flask equipped as shown in Example II, and having a capillary tube to permit purging with nitrogen, was charged with:

| | G. |
|---|---|
| Sodium sarcosinate, 32% solution, 1.02 mol | 353.7 |

The graduated funnel was charged with: Alkyl glycidyl ether=

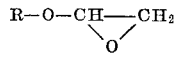

where R (as shown in the preceding formula) conisted of a mixture of alkyl fractions derived from coconut oil and having 0.6% n-decyl, 66.1% lauryl, 25.0% myristyl and 7.6% cetyl groups i.e., containing substantially $C_{12}$–$C_{16}$ alkyl groups, an oxiran oxygen content of 5.4%, M.W. 296.3 (equivalent weight based on oxiran oxygen value), 1.0 mol _____ 296.3

The temperature of the sarcosinate in the flask was raised by means of an electrically heated mantle, and at 90° C. the epoxide was gradually added over a period of one hour and forty minutes with the temperature maintained at about 100° C. The reaction was mildly exothermic. The solution thickened gradually to a fluid gel. The reaction mass was stirred for an additional three hours at 100° C.–103° C., and was then found to contain only 2.62% of unconverted nonionics. One gram of a dried sample which was dissolved in 25 ml. of chloroform and scanned in a Perkin & Elmer, Model 21, spectrophotometer using NaCl cells with a path of 0.5 mm. showed no absorption bands at frequencies of 910 cm.$^{-1}$ and 830 cm.$^{-1}$ which are the typical absorption bands for the oxiran radical.

EXAMPLE VIII

N-(3-fatty alkoxy-2-hydroxypropyl) sodium sarcosinate-N-oxide $$R-O-CH_2-CH(OH)-CH_2-\overset{CH_3}{\underset{\downarrow O}{N}}-CH_2-\overset{O}{\overset{\|}{C}}-O-Na$$

Where R is as described in Example VII.

A reaction apparatus as described in Example II was charged with:

| | G. |
|---|---|
| 0.5 mol equivalent of the reaction product of Example VII in which R is substantially $C_{12}$–$C_{16}$ alkyl groups | 324.7 |
| (containing approx. 0.55 mol equivalent expressed as amine) and | |
| Deionized water | 100 |
| 0.55 mol of hydrogen peroxide, 35% solution | 53.5 | was added gradually at 47° C. to the above at such a rate and under cooling so as to prevent the internal temperature from rising above 70° C. The addition required about one hour after which heating and agitation were continued for three additional hours. The following analytical values (as is basis) were found for the product:

| | |
|---|---|
| Percent free hydrogen peroxide | 0.036 |
| Percent total solids (vacuum oven, 60° C.) | 47.4 |
| Percent activity as amine oxide (M.W. 423) | *45.2 |
| pH | 9.35 |
| Color, Hellige VCS | 12 |
| Physical form: Fluid paste. | |

*Determined by a potentiometrically titrated sample treated with methyl iodide as shown by Hoh et al. Journal of the American Oil Chemists Society, vol. 40, pages 269–271. Samples are titrated with alcoholic HCl in isopropanol solution to a pH of 3.3.

EXAMPLE IX

Example VII was repeated using ethanol as a partial solvent and employing the apparatus of Example I. There were charged into the autoclave:

| | |
|---|---|
| Alkyl glycidyl ether approximately the same as employed in Example VII, but having an oxiran oxygen content of 5.3% 1 mole equivalent (based on oxiran oxygen value) | 301.89 |
| Sodium sarcosinate, 32% solution 1.1 mole __g__ | 381.57 |
| Ethanol SDA 3A 190 proof __g__ | 200.0 |

The reagents were heated and maintained at a temperature of 110° C.±5° C. for eight hours. The following analytical values were obtained for the reaction product:

| | |
|---|---|
| Percent total nonionics | 1.99 |
| Percent total solids | 53.7 |
| pH | 9.6 |
| Color, Hellige VCS | 4–5 |
| Physical form: Pale amber liquid. | |

EXAMPLE X

Using the apparatus of Example II,

| | G. |
|---|---|
| 0.5 mol equivalent of the reaction product of Example IX | 441.7 |
| (Containing approx. 0.55 mol equiv. expressed as amine) were treated with | |
| 0.605 mole of hydrogen peroxide, 35% | 58.77 |

The peroxide was added over a period of one hour at a temperature below 50° C. and the mixture was agitated for an additional four hours at 48° C. to 51° C. The following was the analysis of the reaction product (as is basis):

| | |
|---|---|
| Percent free hydrogen peroxide | 0.03 |
| Percent total nonionics | 2.32 |
| Percent total solids | 50.8 |
| Color, Hellige VCS | 5.0 |
| Physical form: Amber colored liquid. | |

EXAMPLE XI

N(3-fatty alkoxy-2-hydroxypropyl) sodium sarcosinate $$R-O-CH_2-CH(OH)-CH_2-\overset{CH_3}{\underset{}{N}}-CH_2-\overset{O}{\overset{\|}{C}}-O-Na$$

The reaction apparatus of Example I was charged with an alkyl glycidyl ether containing alkyl fractions (R in the above formula) of 4.0% n-hexyl, 57.0% n-octyl, 38% n-decyl and 1.0% n-dodecyl, i.e., substantially $C_8$–$C_{10}$ alkyl groups, an oxiran oxygen content of 7.0%, M.W. 228.6

| | G. |
|---|---|
| (Equivalent weight based on oxiran oxygen value) 1.0 mole | 228.6 |
| Sodium sarcosinate, 32% solution, 1.1 mole | 381.6 |
| Ethanol, SDA 3A 190 proof | 70.0 |

The reagents were agitated and heated for six hours under a blanket of 10 p.s.i.g. nitrogen and at a temperature of 110° C. to 116° C. Upon cooling, the following analysis was obtained (as is basis):

| | |
|---|---|
| Percent total nonionics | 1.8 |
| Percent total solids | 55.2 |
| pH | 10.1 |
| Color, Hellige VCS | 5 |
| Physical form: Pale amber liquid. | |

An infrared spectrophotometric scan showed no absorption bands which are typical for the oxiran radical.

EXAMPLE XII

N(3-fatty alkoxy-2-hydroxypropyl) sodium sarcosinate-N-oxide $$R-O-CH_2-CH(OH)-CH_2-\overset{CH_3}{\underset{\downarrow O}{N}}-CH_2-\overset{O}{\overset{\|}{C}}-O-Na$$

The apparatus of Example II was charged with:

| | G. |
|---|---|
| 0.5 mole equivalent of the reaction product of Example XI in which R is substantially $C_8$–$C_{10}$ alkyl groups as there identified | 340.1 |
| (Containing approx. 0.55 mole equivalent expressed as amine) | |
| 0.605 mole of hydrogen peroxide, 35% solution | 58.77 | was then added gradually to the stirred solution over a period of three hours during which the temperature rose from 25° C. to 48° C. The solution was then heated to 60° C. and maintained under agitation for an additional four hours. The analytical values found for this product were as follows (as is basis):

| | |
|---|---|
| Percent free hydrogen peroxide | Nil |
| Percent total nonionics | 2.12 |
| Percent activity as amine oxide (M.W. 355.6) | 43.4 |
| pH | 9.3 |
| Color, Hellige VCS | 7 |

EXAMPLE XIII

N-3-(tallow fatty) alkoxy-2-hydroxypropyl sodium sarcosinate

An alkyl glycidyl ether containing a mixture of saturated, i.e., (hydrogenated) alkyl groups as distributed in tallow, an oxiran oxygen content of 4.3%, M.W. 372.1 (equivalent weight based on oxiran oxygen value)

|  | G. |
|---|---|
| 1.0 mole | 372.1 |
| Sodium sarcosinate, 32% solution 1.1 mole | 381.57 |
| Isopropyl alcohol | 212.5 | where charged into the pressure reactor described in Example I. The reagents were then heated under a blanket of nitrogen at 5 p.s.i.g. at 110° C.±3° C. for a period of six hours. Upon cooling there was obtained an ivory colored paste of the following analysis (as is basis):

| Percent total nonionics | 4.0 |
|---|---|
| Percent total solids | 55.7 |
| Oxiran oxygen (by infrared analysis) | Nil |
| pH | 10.1 |
| Color, Hellige VCS | 5 |

EXAMPLE XIV

N-3-(tallow fatty) alkoxy-2-hydroxypropyl sodium sarcosinate-N-oxide

Employing the apparatus of Example II

|  | G. |
|---|---|
| 0.5 mole equivalent of the reaction product of Example XIII | 483.1 |
| Were reacted with 0.605 mole of hydrogen peroxide, 35% solution | 58.77 |

The amino compound was warmed to 35° C. and the peroxide added gradually over a period of one hour. The temperature rose to 54° C. resulting from the exothermic reaction, and agitation was continued for six hours at a temperature of 40° C. to 45° C. The resulting product showed the following values (as is basis):

| Percent free hydrogen peroxide | 0.068 |
|---|---|
| Percent total nonionics | 3.50 |
| Percent total solids (vacuum oven, 60° C.) | 47.2 |
| Color, Hellige VCS | 7 |
| pH | 9.5 |

Physical form: Light tan colored paste.

The above examples are for purpose of illustration only and should not be construed as limiting the scope of my invention. Somewhat lower temperatures and/or shorter reaction periods than those shown in the examples may be employed to obtain products of superior color without loss of the desirable properties demonstrated in the tables following. The use of lower temperatures during oxidation of the amines to produce the amine oxides and the use of a lower excess or no excess of hydrogen peroxide will also reduce the color of the hydroxy-alkyl sarcosine oxides as described above.

The ethanol SDA 3A reaction medium, which is ethyl alcohol denatured with five percent methyl alcohol, can be replaced with water, other grades of ethyl alcohol, methyl, propyl, or isopropyl alcohols, water soluble ether alcohols such as methoxyglycol, ethoxyglycol, the corresponding water soluble di- and polyglycols, water soluble mono- and polyethylene and propylene glycols, glycerol, etc. Also the reaction may be carried out in a continuous reaction system.

The highly useful properties of my N-(2-hydroxyalkyl) sarcosine-N-oxides are summarized in Table I below. The data shown in this table were obtained by tests conducted in both deionized water and hard water. The foaming properties and foam stability were determined using the Ross-Miles foam test, as described in "Oil and Soap," 18:99–102(1941). In this procedure a sample of the surfactant solution is discharged from a container through an orifice, to fall through a prescribed height into a pool of like solution.

The concentration of the surfactant, i.e., surface active agent, was 0.05% of the compound under test, which is expressed as an activity of 0.05%, and the temperature was controlled at 25° C. The foam height is indicated as measured immediately after discharge of the sample from the container (instantaneous), after 60 seconds, and after 300 seconds.

Also shown in Table I are data concerning wetting efficiency of my compounds, as determined by the "Draves Test," Synthron tape method, as adapted from the tentative procedure presented to the auxiliaries and Testing Group Meeting of the American Association of Textile Chemists and Colorists, Atlantic City Convention, October 14, 1949. Natural binding tape, 9 inches by 1.25 inches, weighing 1.85±0.1 g. was used along with a stainless steel hook weighing 1.25 g. The tape was obtained from the U.S. Testing Company, Hoboken, N.J. The sinking time of the surfactant, as measured according to this test, is a measure of its wetting properties, with the surfactant having the lower value of time being the better wetting agent.

TABLE I.—FOAMING AND WETTING PERFORMANCE OF SURFACTANT SOLUTIONS HAVING AN ACTIVITY OF 0.05%

| | Hardness of water, p.p.m. | Ross-Miles foam numbers, mm. | | | Draves test in seconds |
|---|---|---|---|---|---|
| | | instant | 60 sec. | 300 sec. | |
| Sodium sarcosinate: | | | | | |
| N-(2-hydroxydodecyl)—(Example I) | 0 | 195 | 180 | 175 | 6.5 |
| | 150 | 70 | 60 | 60 | 9.0 |
| N-(2-hydroxytetradecyl)—(Example III) | 0 | 200 | 175 | 170 | 12.0 |
| | 150 | 20 | 15 | 15 | 26.0 |
| N-(2-hydroxypentadecyl/hexadecyl)—(Example V) | 0 | 150 | 135 | 130 | 28.0 |
| | 150 | 12 | 4 | 3 | 41.0 |
| N-3-(tallow)alkoxy-2-hydroxypropyl—(Example XIII) | 0 | 60 | 50 | 48 | 32.0 |
| | 150 | Flocculates from solution | | | |
| N-3-(lauryl/myristyl)alkoxy-2-hydroxypropyl—(Example VII) | 0 | 190 | 170 | 165 | 11.0 |
| | 150 | 40 | 35 | 35 | 16.5 |
| N-3-(octyl/decyl)alkoxy-2-hydroxypropyl—(Example XI) | 0 | 180 | 160 | 155 | 10.5 |
| | 150 | 95 | 90 | 85 | 11.5 |
| Sodium sarcosinate-N-oxide: | | | | | |
| N-(2-hydroxydodecyl)—(Example II) | 0 | 170 | 145 | 140 | 8.0 |
| | 150 | 150 | 130 | 130 | 9.0 |
| N-(2-hydroxytetradecyl)—(Example IV) | 0 | 200 | 170 | 165 | 16.0 |
| | 150 | 160 | 140 | 135 | 13.0 |
| N-(2-hydroxypentadecyl/hexadecyl)—(Example VI) | 0 | 150 | 135 | 130 | 22.0 |
| | 150 | 110 | 90 | 70 | 24.0 |
| N-3-(tallow)alkoxy-2-hydroxypropyl—(Example XIV) | 0 | 40 | 32 | 30 | 34.0 |
| | 150 | 20 | 17 | 15 | 38.0 |
| N-3-(lauryl/myristyl)alkoxy-2-hydroxypropyl—(Example VIII) | 0 | 175 | 155 | 155 | 11.5 |
| | 150 | 175 | 155 | 150 | 13.0 |
| N-3-(octyl/decyl)alkoxy-2-hydroxypropyl—(Example XII) | 0 | 125 | 115 | 110 | 13.5 |
| | 150 | 125 | 115 | 110 | 12.5 |

As shown in the table, the compounds of Examples I, III, V, VII and XI gave a remarkable foam volume, of excellent stability when tested in deionized water, but showed a much reduced foam number in hard water. It will be noted that sensitivity to hard water of these surfactants is readily overcome by their conversion to the corresponding amine oxides. It will be seen that the amine oxide compounds of Examples II, IV, VI and XII give vigorous foam volume and good foam stability in both soft and hard water. It should also be noted that the tallow derivative of Example 13, which is not soluble in hard water is soluble to a satisfactory degree when converted to the N-oxide of Example XIV. The compound is useful as a conditioning agent and lubricant for hair, textiles, paper and leather.

Even at the low concentrations of 0.05% active matter as employed, all of the compounds showed good and even remarkable wetting properties as determined by the Draves test.

To illustrate the detergency values of my novel surfactants, a series of wash tests were conducted using a Terg-O-Tometer, Model No. BD 101, supplied by the United Testing Company, Incorporated, as a laundering device. This device consists of washing vessels equipped with oscillating agitators, positioned in a thermostatically controlled bath.

The speed of agitation is controlled and the machine duplicates the action of agitator-type home washers. Test runs were made using water having a hardness of 150 p.p.m. The wash cycle had a duration of 20 minutes at a temperature of 120°F.±2° F. and an agitation rate of 100 oscillations per minute. The detergent under test was present at a concentration of 0.05% by weight in conjunction with 0.05% by weight of tetra sodium pyrophosphate. The pH of the wash water containing the detergent and tetrasodium pyrophosphate was 9.4±0.3. Following the wash cycle, there was a rinse cycle having a duration of 10 minutes with the rinse water having a temperature of 120° F.±2° F.

A swatch of artifically soiled cotton fabric supplied by Test Fabrics, Incorporated, measuring 9" x 14" and weighing 14 g. was laundered with each run. The swatch is printed over one-half of its surface with a standard soil, the other half being white. The unsoiled portion, as well as the soiled portion of the fabric, was checked for reflectance by means of a Photovolt Photoelectric Reflection Meter, Model No. 610, using a 610-Y search unit and a green tristimulus filter.

This instrument measures the diffuse reflection intensity. Through use of the green tristimulus filter, the luminous apparent reflectance or the degree of "whiteness" may be determined. The search unit comprises a light source and measuring photocell and galvanometer. On an arbitrary scale, the reflectance of two surfaces may be compared by comparing the relative value of the photocell reading when the reflectance of the two surfaces is compared.

The fabric before washing was tested by measuring the reflectance value of the white portion and of the soiled portion. The meter is adjusted so that the reflectance value of the white portion indicates a reflectance value of 95. The soiled portion then has a reflectance value of 30.

After washing according to the above outlined procedure followed by air drying, the washed sample was measured to determine the reflectance of both the soiled and unsoiled portions of the sample. The effectiveness of the detergent under test was calculated as follows:

W=reflectance value of white portion before laundering (95)
S=reflectance value of soiled portion before laundering (30)
$W_1$=reflectance value of white portion after laundering
$S_1$=reflectance value of soiled portion after laundering $$\text{Percent detergency efficiency} = \frac{S_1 - S}{W - S} \times 100$$

$$\text{Percent whiteness retention} = \frac{W_1}{W} \times 100$$

In the following Table II are shown the Percentage Whiteness Retention and Percentage Detergency Efficiency of the various listed detergents, when tested in the above described manner. Also shown in the table are the reflectance value after laundering for the white portion ($W_1$) and the soiled portion ($S_1$).

TABLE II

| Detergent used: 0.05% by weight, plus 0.05% TSPP | W1 | Whiteness retention, percent | S1 | Detergency efficiency, percent |
|---|---|---|---|---|
| Tetra sodium pyrophosphate, only. | 93.0 | 97.9 | 46.3 | 25.0 |
| Linear dodecyl benzene sodium sulfonate. | 93.7 | 98.6 | 51.3 | 32.8 |
| Sodium sarcosinate-N-oxide: | | | | |
| N-(2-hydroxydodecyl)— (Example II). | 92.0 | 96.8 | 39.0 | 13.8 |
| N-(2-hydroxytetradecyl)— (Example IV). | 93.0 | 97.9 | 53.3 | 35.8 |
| N-(2-hydroxypentadecyl/ hexadecyl)— (Example VI). | 94.0 | 98.9 | 57.3 | 42.0 |
| N-3-(lauryl/myristyl) alkoxy-2-hydroxypropyl— (Example VIII). | 92.7 | 97.6 | 50.7 | 31.8 |
| N-3-(octyl/decyl)alkoxy-2-hydroxypropyl— (Example XII). | 93.7 | 98.6 | 45.0 | 23.0 |

As shown in Table II, the compounds of my invention each showed detergency properties and the compounds of Examples IV and VI showed properties as detergents which are markedly superior to the widely used linear alkylbenzene sodium sulfonate.

A surprising property of my N-(2-hydroxyalkyl)-sarcosine-N-oxides is their excellent solubility and performance over the entire pH range in either hard or soft water. This behavior distinguishes these compounds from widely used amphoterics, such as for instance the N-fatty beta aminopropionates or the N-fatty beta iminodipropionates. These latter compounds exhibit minimum solubility in water in the iso-electric range, generally at a pH level of 1.3 to 4.7. To illustrate, 5% by weight of sodium N-coco beta amino-propionate was dissolved in deionized water, and the clear solution was gradually acidified with reagent grade hydrochloric acid. At a pH of 3.8 most of the dissolved surface active agent precipitated and formed a viscous curd-like layer over the surface of the liquid. The lower aqueous layer contained only 0.55% of alcohol soluble matter in 1.10% total solids. In contrast, a 5% solution of sodium N-(2-hydroxydodecyl)-sarcosinate-N-oxide remained in stable solution over a pH range of 12 to 1. Example XV, which follows, demonstrates not only the superior solubility of my compounds, but also their hydrolytic stability. The usefulness of the free acids, for example, N-(2-hydroxydodecyl)-sarcosine-N-oxide is also shown thereby. The free acid form, also often referred to as the Zwitterion form, yields solutions of highest viscosity. This occurs generally at a pH above about 5 and below about 9.

EXAMPLE XV

Solutions of sodium N-(2-hydroxydodecyl)-sarcosinate-N-oxide at an activity of 0.05% (i.e., 0.05% by weight of the active ingredient) were made up in deionized water having a hardness of 0 p.p.m. and in hard water having a hardness of 150 p.p.m. These solutions were then acidified with hydrochloric acid to a pH of 2.7 for the deionized water solution and a pH of 2.8 for the hard water solution. When tested according to the Ross-Miles foam test, as described previously with regard to Table I, both the deionized water solution and hard water solutions had instantaneous foam numbers of 165 mm., 60-second foam numbers of 145 mm., and 300-second foam numbers of 140 mm.

A five percent solution of the sodium-N-(2-hydroxydodecyl)-sarcosinate-N-oxide in deionized water, which was acidified with hydrochloric acid to a pH of 2, was tested for stability over a period of one month. At the end of this period, the solution was clear and free of precipitate.

By comparing the results of Example XV with those of Table I (Example II), it is shown that the effectiveness of the sarcosinate-N-oxide as the free acid was comparable to that of the compound in the form of the sodium salt, thus demonstrating the relatively uniform performance of my sarcosinate-N-oxide compounds under acid or alkaline conditions in either hard or deionized water.

It is well known that most surface active agents induce corrosion in aqueous solutions, and in particular, in dilute aqueous solutions. The compounds of my invention, however, distinguish themselves by exhibiting rust preventive properties. The corrosion inhibition of my N-(2-hydroxyalkyl)-sarcosine-N-oxides is so effective, that they may be usefully employed as additives to other corrosive surface active agents since my compounds are compatible with other surface active agents, whether anionic, cationic, nonionic, or amphoteric in nature. The great effectiveness of my compounds is demonstrated in Table III.

TABLE III.—STATIC CORROSION INHIBITION TEST

| Compound in deionized water | Activity, percent | Results |
| --- | --- | --- |
| Sodium dodecyl benzene sulfonate (linear) | 1.0 | Severe rusting; pitting above surface. |
| Isooctylphenyl polyexthoxyethanol (9–10EO). | 1.0 | Do. |
| Sodium sarcosinate-N-oxide: | | |
| N-(2-hydroxytetradecyl) | 1.0 | No rusting or staining. |
|  | 0.1 | Do. |
|  | 0.01 | Slight rusting below surface. |
| N-(2-hydroxypentadecyl/hexadecyl) | 1.0 | No rusting or staining. |
| N-3-(lauryl/myristyl)alkoxy-2-hydroxy propyl. | 1.0 | Slight staining on edges. |
| Sodium N-(2-hydroxytetradecyl) sarcosinate-N-oxide and sodium dodecylbenzene sulfonate (linear). | (¹) | No rusting or staining. |
| Sodium N-(2-hydroxytetradecyl) sarcosinate-N-oxide and isooctyphenyl polyethoxyethanol (9–10EO). | (¹) | Do. |

¹ 0.5 each.

The data set forth in above Table III was obtained by placing 1″ x 3″ steel coupons, 24 U.S. Standard Gage, in 4 oz. wide mouth screw cap glass jars containing 50 ml. of the test solution at a pH of 10.2±0.2. The containers were then shaken for one minute to wet the metal surface extending over half its length above the liquid level, and stored at room temperature for 100 hours. The conditions of the coupons following exposure are set forth in the table, together with the concentration of the test solutions in activity-percent, i.e., the concentration of the active ingredient being tested in weight percent.

As shown, my compounds were not only effective by themselves as corrosion inhibitors but they also were effective in inhibiting corrosion when used in conjunction with sodium dodecyl benzene sulfonate or isooctylphenyl polyethoxyethanol which are corrosive surface active agents.

The unusual combination of physical properties of my novel surface active agents is further augmented by their bland taste and freedom from skin irritation. Table IV, which follows, presents test data concerning the effect of my compounds as primary skin irritants. The tests were conducted in accord with section 191.11 of the Hazardous Substances Labeling Act of 1960 as published by the United States Food and Drug Administration.

Primary irritation to the skin was measured by a patch-test technique on the abraded and intact skin of the albino rabbit, clipped free of hair. A minimum of six subjects were used in abraded and intact skin tests. Introduced under a square patch such as surgical gauze measuring 1 inch x 1 inch, two single layers thick were 0.5 milliliter of the test solution. The animals were immobilized and patches were secured in place by adhesive tape. The entire trunk of the animals was then wrapped with an impervious material such as rubberized cloth for the 24-hour period of exposure. This material aids in maintaining the test patches in position and retards the evaporation of volatile substances. After 24 hours of exposure, the patches were removed and the resulting reactions were evaluated on the basis of the designated values in the following table:

Evaluation of skin reactions: Value [1]
- Erythema and eschar formation:
    - No erythema _____ 0
    - Very slight erythema (barely perceptible) ___ 1
    - Well-defined erythema _____ 2
    - Moderate to severe erythema _____ 3
    - Severe erythema (beet redness) to slight eschar formation (injuries in depth) _____ 4
- Edema formation:
    - No edema _____ 0
    - Very slight edema (barely perceptible) _____ 1
    - Slight edema (edges of area well defined by definite raising) _____ 2
    - Moderate edema (raised approximately 1 millimeter) _____ 3
    - Severe edema (raised more than 1 millimeter and extending beyond the area of exposure) _____ 4

[1] The "value" recorded for each reading is the average value of the six or more animals subject to the test.

Readings were again made at the end of a total of 72 hours (48 hours after the first reading). An equal number of exposures were made on areas of skin that had been previously abraded. The abrasions were minor incisions through the stratum corneum, but not sufficiently deep to disturb the derma or to produce bleeding. After evaluating the reactions of the abraded skin at 24 hours and 72 hours, as described in this paragraph, the values for erythema and Eschar formation at 24 hours and at 72 hours for intact skin were added to the values on abraded skin at 24 hours and at 72 hours (four values). Similarly, the values for edema formation at 24 hours and at 72 hours for intact and abraded skin were added (four values). The total of the eight values was divided by four to give the primary irritation index.

The materials tested, as shown in Table IV, were each in a 5% solution in water neutralized to a pH of 7±0.2.

TABLE IV

N-3-(tallow)alkoxy-2-hydroxypropyl-sodium sarcosinate (Example XIII) pH 7.1

| Skin reaction | Exposure time in hours | Mean score exposure unit value |
| --- | --- | --- |
| A. Erythema and Eschar: | | |
| Intact skin | 24 | 1.0 |
| Do | 72 | 0.0 |
| Abraded skin | 24 | 1.0 |
| Do | 72 | 0.0 |
| Subtotal | | 2.0 |
| B. Edema: | | |
| Intact skin | 24 | 0.0 |
| Do | 72 | 0.0 |
| Abraded skin | 24 | 0.0 |
| Do | 72 | 0.0 |
| Subtotal | | 0.0 |
| Total | | 2.0 |

NOTE.—Irritation index = 2.0/4 = 0.5.

N-3-(tallow)alkoxy-2-hydropropyl-sodium sarcosinate-N-oxide (Example XIV) pH 6.8

| Skin reaction | Exposure time in hours | Mean score exposure unit value |
|---|---|---|
| A. Erythema and Eschar: | | |
| Intact skin | 24 | 1.0 |
| Do | 72 | 0.0 |
| Abraded skin | 24 | 1.0 |
| Do | 72 | 0.0 |
| Subtotal | | 2.0 |
| B. Edema: | | |
| Intact skin | 24 | 0.0 |
| Do | 72 | 0.0 |
| Abraded skin | 24 | 0.0 |
| Do | 72 | 0.0 |
| Subtotal | | 0.0 |
| Total | | 2.0 |

NOTE.—Irritation index = $\frac{2.0}{4}$ = 0.5.

N-3-(lauryl/myristyl)alkoxy-2-hydroxypropyl sodium sarcosinate (Example VII) pH 7.1

| Skin reaction | Exposure time in hours | Mean score exposure unit value |
|---|---|---|
| A. Erythema and Eschar: | | |
| Intact skin | 24 | 1.0 |
| Do | 72 | 0.0 |
| Abraded skin | 24 | 1.0 |
| Do | 72 | 0.0 |
| Subtotal | | 2.0 |
| B. Edema: | | |
| Intact skin | 24 | 0.0 |
| Do | 72 | 0.0 |
| Abraded skin | 24 | 0.0 |
| Do | 72 | 0.0 |
| Subtotal | | 0.0 |
| Total | | 2.0 |

NOTE.—Irritation index = $\frac{2.0}{4}$ = 0.5.

N-3-(laury/myristyl)alkoxy-2-hydroxypropyl sodium sarcosinate-N-oxide (Example VIII) pH 7.1

| Skin reaction | Exposure time in hours | Mean score exposure unit value |
|---|---|---|
| A. Erythema and Eschar: | | |
| Intact skin | 24 | 0.0 |
| Do | 72 | 0.0 |
| Abraded skin | 24 | 0.0 |
| Do | 72 | 0.0 |
| Subtotal | | 0.0 |
| B. Edema: | | |
| Intact skin | 24 | 0.0 |
| Do | 72 | 0.0 |
| Abraded skin | 24 | 0.0 |
| Do | 72 | 0.0 |
| Subtotal | | 0.0 |
| Total | | 0.0 |

NOTE.—Irritation index = $\frac{0.0}{4}$ = 0.0.

N-(2-hydroxydodecyl)sodium sarcosinate (Example I) pH 6.9

| Skin reaction | Exposure time in hours | Mean score exposure unit value |
|---|---|---|
| A. Erythema and Eschar: | | |
| Intact skin | 24 | 1.0 |
| Do | 72 | 0.0 |
| Abraded skin | 24 | 1.0 |
| Do | 72 | 0.0 |
| Subtotal | | 2.0 |
| B. Edema: | | |
| Intact skin | 24 | 0.0 |
| Do | 72 | 0.0 |
| Abraded skin | 24 | 0.0 |
| Do | 72 | 0.0 |
| Subtotal | | 0.0 |
| Total | | 2.0 |

NTE.—Irritation index = $\frac{2.0}{4}$ = 0.5.

N-(2-hydroxydodecyl)sodium sarcosinate-N-oxide (Example II) pH 7.15

| Skin reaction | Exposure time in hours | Mean score exposure unit value |
|---|---|---|
| A. Erythema and Eschar: | | |
| Intact skin | 24 | 0.0 |
| Do | 72 | 0.0 |
| Abraded skin | 24 | 0.0 |
| Do | 72 | 0.0 |
| Subtotal | | 0.0 |
| B. Edema: | | |
| Intact skin | 24 | 0.0 |
| Do | 72 | 0.0 |
| Abraded skin | 24 | 0.0 |
| Do | 72 | 0.0 |
| Subtotal | | 0.0 |
| Total | | 0.0 |

NOTE.—Irritation index = $\frac{0.0}{4}$ = 0.0.

Sodium lauryl sulfate (pH 7.15)

| Skin reaction | Exposure time in hours | Mean score exposure unit value |
|---|---|---|
| A. Erythema and Eschar: | | |
| Intact skin | 24 | 2.0 |
| Do | 72 | 4.0 |
| Abraded skin | 24 | 3.0 |
| Do | 72 | 4.0 |
| Subtotal | | 13.0 |
| B. Edema: | | |
| Intact skin | 24 | 1.0 |
| Do | 72 | 0.0 |
| Abraded skin | 24 | 2.0 |
| Do | 72 | 0.0 |
| Subtotal | | 3.0 |
| Total | | 16.0 |

NOTE.—Irritation index = $\frac{16.0}{4}$ = 4.0.

The results shown in Table IV demonstrate the great mildness to the skin of my N-(2-hydroxyalkyl) sarcosinate-N-oxides which had an irritation index of zero to 0.5. These compounds were, in general, surprisingly milder than their respective precursor N-(2 - hydroxyalkyl) sarcosinates which had irritation indices of 0.5. Compare, for example, the results of Example VIII with those of Example VII and the results of Example II with those of Example I. All of my N-(2-hydroxyalkyl) sarcosinate-N-oxide compounds were far superior to sodium lauryl sulfate which had an irritation index of 4.0 when tested under identical conditions. Sodium lauryl sulfate is a widely used surface active agent which forms the base of many shampoos and skin cleansing formulation, and was, therefore, used as a basis of comparison. Products which have an irritation index of five or more using the test procedure employed for obtaining the data set forth in Table IV are classified as primary irritants.

As described in the foregoing specification, my compounds have a variety of applications. They may be used in dentifrices, mouthwashes or shampoos of various types as illustrated respectively by pages 328–347, 369-375, and 380–408 of Cosmetics Science and Technology, edited by Edward Sagarin, Interscience Publishers, Inc., New York, N.Y. (1957). When employed as detergents, they may be used in conjunction with various conventional detergent builders such as ortho-, pyro- and polyphosphates, alkali metal silicates, etc. See, for example, pages 1744–1774, Phosphorus and Its Compounds, volume II, edited by John R. Van Wazer, Interscience Publishers. When employed in metal cleaners, my compounds may be used in conjunction with sodium silicate, phosphoric acid, soda ash, caustic soda and various other conventional ingredients as described at pages 1775–1797 of Phosphorus and Its Compounds, supra. Other conventional detergent builders which may be used with my compounds are described at pages 232–237 of Surface Active Agents, Anthony M. Schwartz and James W. Perry, volume I, Interscience Publishers.

Still other uses for my compounds are as additives to water, whether fresh water, brackish water or brine, used in the secondary recovery of oil by water flooding, and also in other well working operations such as acidizing and hydraulic fracturing. The addition of my compounds to water used in such operations inhibits corrosion of metal surfaces which come in contact with the water.

While I have described particular embodiments of my invention in the foregoing specification, it should be understood that various modifications and adaptations thereof may be made within the spirit of the invention, as set forth in the appended claims.

I claim:
1. Compounds having the formula:

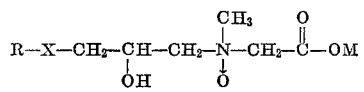

wherein X is either oxygen or a methylene radical, R is an alkyl group having from 8 to 18 carbon atoms when X is oxygen and from 6 to 16 carbon atoms when X is a methylene radical, and M is hydrogen, an alkali metal, ammonium, or a water-soluble alkyl-, hydroxyalkyl-, or alkyl ether amino group.

2. The compounds of claim 1 wherein M is hydrogen.
3. The compounds of claim 1 wherein M is an alkali metal.
4. The compounds of claim 3, wherein M is sodium.
5. The compounds of claim 3, wherein M is potassium.
6. N-(2-hydroxydodecyl) sodium sarcosinate-N-oxide.
7. N-(2-hydroxytetradecyl) sodium sarcosinate-N-oxide.
8. N-(2-hydroxypentadecyl/hexadecyl) sodium sarcosinate-N-oxide.
9. The compounds of claim 1 wherein the said water soluble amino group contains an ethanol, isopropanol, methyl, ethyl group, or mixtures thereof, or said amino group is a morpholino group.
10. Compounds having the formula:

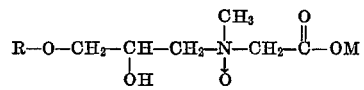

wherein R is an alkyl group having from 8 to 18 carbon atoms and M is hydrogen, an alkali metal, ammonium, or a water-soluble alkyl-, hydroxyalkyl-, or alkyl ether amino group.

11. The compounds of claim 10, wherein M is hydrogen.
12. The compounds of claim 10, wherein M is an alkali metal.
13. The compounds of claim 12, wherein M is sodium.
14. The compounds of claim 12, wherein M is potassium.
15. Compounds having the formula:

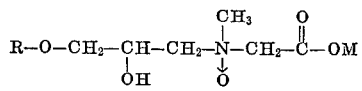

wherein R is an alkyl group having from 8 to 18 carbon atoms and M is selected from the group consisting of hydrogen, alkali metals, ammonium, and water-soluble amines chosen from the group consisting of ethanol, isopropanol, methyl, ethyl amines, or mixtures thereof, or a morpholino group.

16. N-(3-fatty alkoxy-2-hydroxypropyl) sodium sarcosinate-N-oxide compounds having the formula:

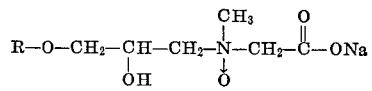

wherein R represents $C_{12}$–$C_{16}$ alkyl groups.

17. N-(3-fatty alkoxy-2-hydroxypropyl) sodium sarcosinate-N-oxide compounds having the formula:

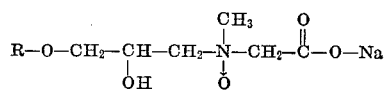

wherein R represents $C_8$–$C_{10}$ alkyl groups.

18. N-3-(tallow fatty) alkoxy-2-hydroxypropyl sodium sarcosinate-N-oxide.

References Cited
UNITED STATES PATENTS

| | | | |
|---|---|---|---|
| 3,417,136 | 12/1968 | Hovden | 260—534 O |
| 3,267,135 | 8/1966 | Cahn et al. | 252—152 |
| 2,159,967 | 5/1939 | Engelman | 260—404 |

LORRAINE A. WEINBERGER, Primary Examiner

J. L. DAVISON, Assistant Examiner

U.S. Cl. X.R.

252—137, 152, 392, 394; 160—247.2 R, 501.11; 424—54, 70, 248, 319